United States Patent Office.

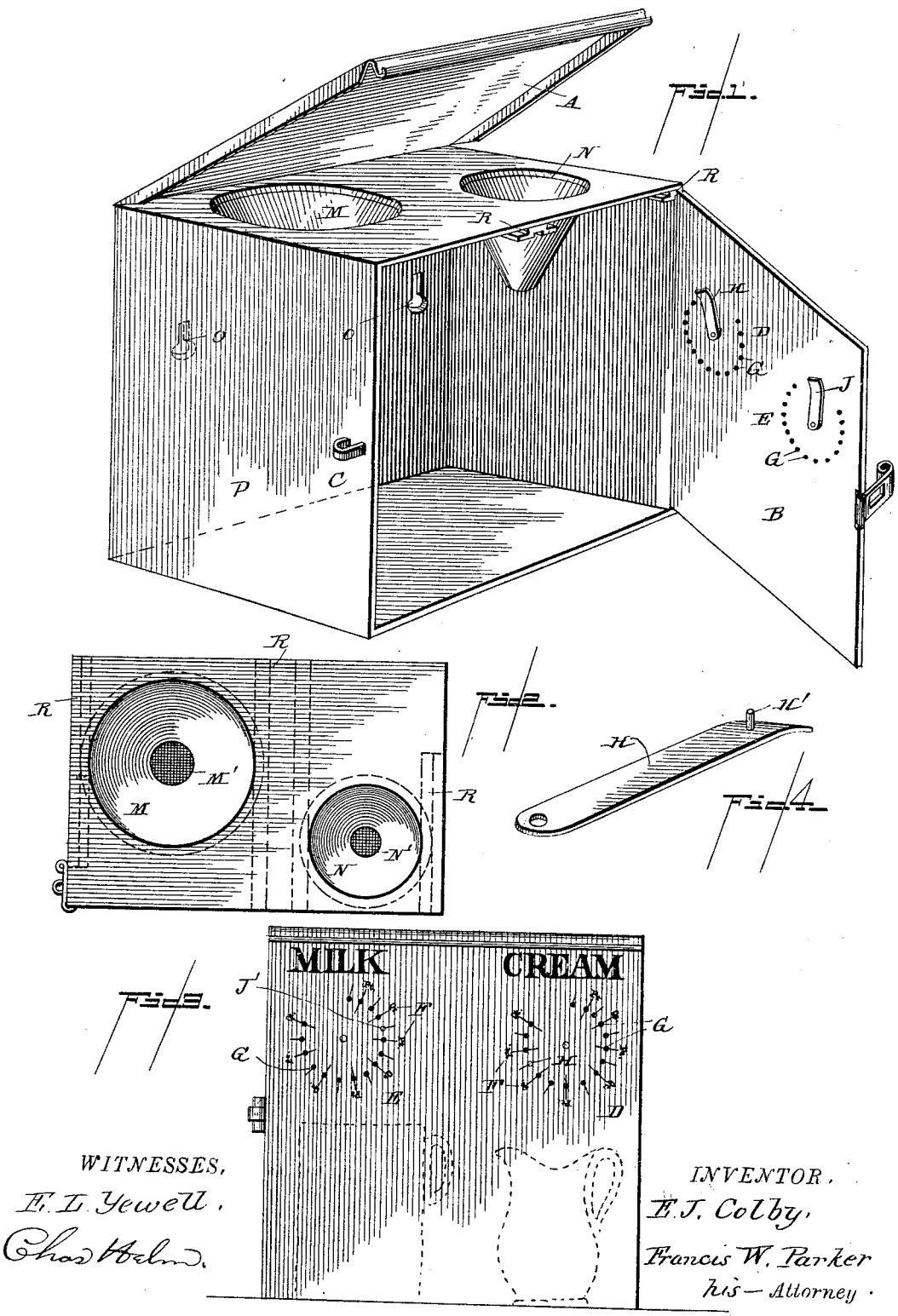

EDWARD J. COLBY, OF CHICAGO, ILLINOIS.

MILK-BOX.

SPECIFICATION forming part of Letters Patent No. 388,124, dated August 21, 1888.

Application filed September 5, 1887. Serial No. 248,793. (No model.)

*To all whom it may concern:*

Be it known that I, EDWARD J. COLBY, a citizen of the United States, residing at Chicago, county of Cook, and State of Illinois, have invented a new and useful Milk-Box, of which the following is a specification.

My invention relates to improvements in boxes for holding milk and cream, and its object is to provide a box which may be secured on the outside of the house or in an entry-way, with a lid, funnels, and interior spaces to hold milk and cream pitchers or cans, so that the milkman may leave the milk in the place without disturbing the household. I attain these objects by the mechanism illustrated in the following drawings, in which—

Figure 1 represents a perspective view of my invention; Fig. 2, a top view thereof; Fig. 3, a front elevation, and Fig. 4 a perspective view, of the spring indicating-arm.

Like letters refer to like parts in all the figures.

A is a lid; B, a door; C, a fastening device; D, a cream-scale; E, a milk-scale; F F, a series of pint and quart marks arranged as part of said cream and milk scales.

G G are a series of apertures arranged each in a circle and penetrating the door.

H is an arm pivoted on the inside of the door and provided with a peg, H', at its outer end, which peg H' passes through the holes or apertures G. The arm H is elastic. J is a similar arm, with the peg J'.

M and N are funnels having rims on their upper edges, which rims slide upon the ledges R R. Said funnels are provided, respectively, with the sieves N' and M'.

P is the body of the box.

O O are elongated apertures in the back of the box.

The use and operation of my invention are as follows:

The box is suspended at the desired position—as, for instance, outside the door—by means of knobs or other fastenings which pass through the apertures O, and are then turned about, so as to prevent removal of the box except when the door is opened. The funnels are now slid into place, as shown in Fig. 2, and the milk and cream cans are placed in the box under the strainers, as shown in dotted lines, Fig. 3. The spring-arms on the back of the door are then set so that their pins protrude from the holes in the scale, so as to indicate how many pints or quarts of each is desired. The lid is now closed down and the door closed and locked. When the milkman arrives, by an inspection of the scales he can determine how much cream and how much milk is desired. He then lifts the lid and pours the proper amount of cream or milk in. Here such milk or cream is strained by means of sieves in the bottom of the funnels. The lid is then closed down, and the milk and cream are securely protected from dirt, dust, animals, thieves, and the like until the proprietor comes, when the door is unlocked, the cans or pitchers removed, and the funnels may then also be removed and cleaned, if desired.

I claim as follows:

1. In a milk-box, the combination of the box having a hinged door and lock and a hinged lid with ledges secured along the top of said box, funnels which are suspended from said ledges and apertures in the top of said box which open into said funnels.

2. In a milk-box, a registering-scale consisting of a circle of indicating-marks, a circle of apertures, and an internal hand or arm which may be made to register with any one of said apertures to indicate the quantity of cream or milk desired.

In witness whereof I have hereunto set my hand this 1st day of September, 1887.

EDWARD J. COLBY.

Witnesses:
 FRANCIS W. PARKER,
 NORA E. MARSHALL.